US012119196B2

(12) United States Patent
Yoshikawa et al.

(10) Patent No.: US 12,119,196 B2
(45) Date of Patent: Oct. 15, 2024

(54) TEMPERATURE SENSITIVE PELLET-TYPE THERMAL FUSE

(71) Applicant: SCHOTT JAPAN CORPORATION, Shiga (JP)

(72) Inventors: Tokihiro Yoshikawa, Shiga (JP); Eigo Kishi, Shiga (JP); Tamotsu Wakabayashi, Shiga (JP)

(73) Assignee: SCHOTT JAPAN CORPORATION, Shiga (JP)

( * ) Notice: Subject to any disclaimer, the term of this patent is extended or adjusted under 35 U.S.C. 154(b) by 102 days.

(21) Appl. No.: 17/759,427

(22) PCT Filed: Apr. 8, 2021

(86) PCT No.: PCT/JP2021/014912
§ 371 (c)(1),
(2) Date: Jul. 25, 2022

(87) PCT Pub. No.: WO2021/206143
PCT Pub. Date: Oct. 14, 2021

(65) Prior Publication Data

US 2023/0094205 A1 Mar. 30, 2023

(30) Foreign Application Priority Data

Apr. 10, 2020 (JP) ................................ 2020-071134

(51) Int. Cl.
*H01H 85/041* (2006.01)
*H01H 85/055* (2006.01)
(Continued)

(52) U.S. Cl.
CPC ........ *H01H 85/041* (2013.01); *H01H 85/055* (2013.01); *H01H 85/143* (2013.01); *H01H 85/17* (2013.01)

(58) Field of Classification Search
CPC .. H01H 85/041; H01H 85/055; H01H 85/143; H01H 85/17; H01H 37/765
See application file for complete search history.

(56) References Cited

U.S. PATENT DOCUMENTS 4,281,309 A * 7/1981 Olson .................. H01H 37/765 29/623
4,825,187 A * 4/1989 Cenky .................. H01H 37/765 337/407
(Continued)

FOREIGN PATENT DOCUMENTS

JP S5390940 U 7/1978
JP S5422145 U 2/1979
(Continued)

OTHER PUBLICATIONS

Feb. 14, 1979, Entire Document (Translation of JPS5422145) (of record, cited in the IDS, including Original Document). (Year: 1979).*
(Continued)

*Primary Examiner* — Stephen S Sul
(74) *Attorney, Agent, or Firm* — Dorsey & Whitney LLP

(57) ABSTRACT

Provided is a temperature-sensitive pellet-type thermal fuse having excellent reliability including an insulation property after having operated. The fuse includes, in a tubular case with high electrical conductivity and high thermal conductivity, at least a temperature-sensitive pellet being capable of melting and softening at a specific temperature, a strong compression spring pressing the temperature-sensitive pellet, an insulating lid body closing an end portion of an opening of the tubular case, a weak compression spring being in contact with the insulating lid body, a first lead having an inner end penetrating the insulating lid body as a stationary contact, and a movable contact electrically con-
(Continued)

nected to the first lead and the tubular case, and further includes a second lead disposed at an end of the tubular case.

19 Claims, 6 Drawing Sheets

(51) Int. Cl.
*H01H 85/143* (2006.01)
*H01H 85/17* (2006.01)

(56) References Cited

U.S. PATENT DOCUMENTS

| | | | | |
|---|---|---|---|---|
| 7,323,965 | B2 * | 1/2008 | Yoshikawa | H01H 37/765<br>337/159 |
| 2005/0088272 | A1 | 4/2005 | Yoshikawa | |
| 2007/0236324 | A1 * | 10/2007 | Yoshikawa | H01H 37/765<br>337/237 |
| 2008/0083704 | A1 * | 4/2008 | Ozil | H01H 33/904<br>218/154 |
| 2009/0091417 | A1 * | 4/2009 | Yoshikawa | H01H 37/765<br>337/298 |
| 2009/0184208 | A1 * | 7/2009 | West | F16J 15/108<br>277/572 |
| 2013/0334471 | A1 * | 12/2013 | Hinrichs | H01B 1/12<br>252/500 |
| 2015/0091689 | A1 * | 4/2015 | Nguyen | H01H 37/765<br>337/298 |
| 2016/0005512 | A1 * | 1/2016 | Sekido | H02G 1/14<br>174/72 A |
| 2020/0088246 | A1 * | 3/2020 | Ewan | H01H 69/02 |

FOREIGN PATENT DOCUMENTS

| | | | | | |
|---|---|---|---|---|---|
| JP | H01154422 | A | | 6/1989 | |
| JP | H05159672 | A | | 6/1993 | |
| JP | 2005158681 | A | | 6/2005 | |
| JP | 2007018904 | A | | 1/2007 | |
| JP | 2007042520 | A | | 2/2007 | |
| JP | 2008153226 | A | * | 7/2008 | H01M 10/425 |
| WO | 2021/206143 | | | 10/2021 | |

OTHER PUBLICATIONS

Shiga Akira, "Safety Device", Jun. 25, 1993, Takachiho Electric, Entire Document (Translation of JP H05159672) (of record, cited in the IDS, including Original Document). (Year: 1993).*

Ishikawa Yuji; Nishimura Junichi; Yamaguchi Yoji; Takakuwa Yoshinori; Karaushi Katsuhiro, "Fuse for Low-Voltage Underground Lead-In", Jan. 25, 2007, Entire Document (Translation of JP 2007018904) (of record, cited in the IDS, including Original Document). (Year: 2007).*

Yang Szu-Nan, "System for Supplying Electrical Energy", Jul. 3, 2008, Entire Document (Translation of JP 2008153226). (Year: 2008).*

[English Translation] Written Opinion mailed on Jun. 29, 2021, for International Patent Application No. PCT/JP2021/014912, pp. all.

International Preliminary Report on Patentability mailed on Oct. 20, 2022, for International Application No. PCT/JP2021/014912, pp. all.

[English Translation] Notice of Reasons for Refusal for Japanese Patent Application No. 2020-071134 mailed on Nov. 16, 2022, pp. all.

International Search Report and Written Opinion (English Translation for ISR only) mailed on Jun. 29, 2021 for International Patent Application No. PCT/JP2021/014912.

* cited by examiner

TEMPERATURE SENSITIVE PELLET-TYPE THERMAL FUSE

TECHNICAL FIELD

The present invention relates to a temperature-sensitive pellet-type thermal fuse that breaks an electric circuit upon sensing overheating of an electric device, for example.

BACKGROUND ART

For a domestic electric appliance or an industrial electric or electronic device, a thermal fuse is used as a protective component for immediately breaking a circuit upon occurrence of abnormal overheating by sensing the temperature of the device. Such a thermal fuse is mounted on a product, such as a domestic electric appliance, a portable device, a communication device, an office appliance, an in-car device, an AC adapter, a charger, a motor, or a battery, for example. Typically, thermal fuses come in a wide variety of types: those with a rated current of about 0.5 A to 15 A. In particular, a temperature-sensitive pellet-type thermal fuse with a high rated current of 6 A or more is preferably used. As a typical embodiment of a temperature-sensitive pellet-type thermal fuse, there is known a temperature-sensitive pellet-type thermal fuse that includes, as disclosed in Patent Literature 1, for example, a tubular metal case with an internal hollow space (hereinafter referred to as a tubular case), a first lead and a second lead disposed at opposite ends of the tubular case, a temperature-sensitive pellet disposed in contact with the second lead, and a movable contact that is in contact with the first lead via the temperature-sensitive pellet and is always urged in the separation direction. When the temperature of an electric device on which the fuse is mounted has become greater than or equal to a predetermined temperature, the temperature-sensitive pellet melts or softens, whereby the movable contact is separated from the first lead with the urging force, thereby breaking the circuit. When a temperature-sensitive pellet-type thermal fuse with such a configuration is connected in series with an electric device and is disposed at a position where one wants to detect an abnormal temperature rise of the electronic or electric device, it is possible to feed or distribute power to the electric device via the temperature-sensitive pellet-type thermal fuse. The temperature-sensitive pellet is solid at ordinary temperature, and with the urging force at this time, the movable contact is pressed against and makes contact with an end portion, located in the case, of the first lead. Therefore, the first lead—the movable contact—the tubular case—the second lead are held in an electrically connected state. When the temperature of the portion where the temperature-sensitive pellet-type thermal fuse is disposed has increased to the operating temperature of the fuse due to abnormal electrical conduction, such as a short of the electric device, for example, the temperature-sensitive pellet melts so that the urging force that allows the movable contact to be pressed against and make contact with the end portion of the first lead becomes smaller and is then released. Thus, the movable contact is separated from the end portion, located in the case, of the first lead, with the result that the first lead and the second lead are electrically disconnected. Accordingly, power feeding or distribution to the electric device stops and a temperature rise of the electric device is avoided. Thus, it is possible to prevent damage to electrical equipment due to overheating or prevent accidents, such as ignition, resulting therefrom.

DOCUMENT LIST

Patent Literatures

Patent Literature 1: Japanese Patent Application Publication No. H01-154422
Patent Literature 2: Japanese Patent Application Publication No. 2005-158681

SUMMARY OF INVENTION

Technical Problem

The conventional temperature-sensitive pellet-type thermal fuse includes, like a temperature-sensitive pellet-type thermal fuse 60 illustrated in FIG. 6, in a tubular case 61 with high electrical conductivity and high thermal conductivity, a temperature-sensitive pellet 62 being capable of melting and softening at a specific temperature, a strong compression spring 63 pressing the temperature-sensitive pellet 62, an insulating lid body 64 closing an end portion 600 of an opening of the tubular case 61, a weak compression spring 65 being in contact with the insulating lid body 64, a first lead 66 having an inner end penetrating the insulating lid body 64 as a stationary contact, and a movable contact 67 electrically connected to the first lead 66 and the tubular case 61, and further includes a second lead 68 disposed at one end of the tubular case 61. The end portion 600 of the opening of the tubular case 61 is made narrower by swaging to allow the insulating lid body 64 to be fixed at the end portion 600 of the opening so that the insulating lid body 64 will not stick out outward and come off due to the urging force of the spring. Further, the first lead 66 is widened by swaging at its proximal portion 601 at an outer end so that the first lead 66 is fixed while being inserted in a through-hole provided in the center of the insulating lid body 64. The tubular case 61, the first lead 66, and the insulating lid body 64 are sealed with a sealing resin 602. Since the end portion 600 of the opening of the tubular case 61 is made narrower by swaging toward the first lead 66 lying on the central axis of the tubular case 61, the insulation distance between the tubular case 61 and the first lead 66 is the narrowest at the end portion 600 of the opening of the tubular case 61. Therefore, the insulation property of the thermal fuse depends on the volume resistivity of the sealing resin 602. This is prominent at high temperatures, in particular. Thus, there have been limitations in addressing the withstand voltage and maintaining the insulation performance at high temperatures.

It is an object of the present invention to provide a temperature-sensitive pellet-type thermal fuse having improved insulation resistance and also having excellent reliability including an insulation property after having operated.

Solution to Problem

According to a first aspect of the present invention, there is provided a temperature-sensitive pellet-type thermal fuse that includes, in a tubular case with high electrical conductivity and high thermal conductivity, at least a temperature-sensitive pellet being capable of melting or softening at a specific temperature, a strong compression spring pressing the temperature-sensitive pellet, an insulating lid body closing an end portion of an opening of the tubular case, a weak compression spring being in contact with the insulating lid body, a first lead having an inner end penetrating the insulating lid body as a stationary contact, and a movable contact electrically connected to the first lead and the tubular case, and further including a second lead disposed at an end of the tubular case. In a sealed portion of the tubular case, at least a proximal portion at an outer end of the first lead is shielded by insulating means provided between the end portion of the opening of the tubular case and the first lead, and the tubular case, the first lead, and the insulating lid body are sealed with a sealing resin. The aforementioned insulating means can improve the electrical insulation property of the narrowest portion of the insulation distance between the tubular case and the first lead, and can also improve heat resistance while securing mechanical strength.

There is provided a temperature-sensitive pellet-type thermal fuse in which as the aforementioned insulating means, an insulating tube is inserted into the narrowest portion between the tubular case and the first lead and is sealed with a sealing resin. For example, the temperature-sensitive pellet-type thermal fuse includes, in a tubular case with high electrical conductivity and high thermal conductivity, at least a temperature-sensitive pellet being capable of melting and softening at a specific temperature, a strong compression spring pressing the temperature-sensitive pellet, an insulating lid body closing an end portion of an opening of the tubular case, a weak compression spring being in contact with the insulating lid body, a first lead having an inner end penetrating the insulating lid body as a stationary contact, and a movable contact electrically connected to the first lead and the tubular case, and further includes a second lead disposed at an end of the tubular case. The insulating tube is arranged around a proximal portion at an outer end of the first lead where the gap between the end portion of the opening of the tubular case and the first lead is the narrowest. Accordingly, the temperature-sensitive pellet-type thermal fuse is provided in which the tubular case, the insulating tube, the insulating lid body, and the first lead are sealed with a sealing resin in a state in which at least the proximal portion at the outer end of the first lead is shielded. The aforementioned insulating tube forms the insulating means and is provided in contact with an outer end face of the insulating lid body.

According to another aspect, there is provided a temperature-sensitive pellet-type thermal fuse in which as the aforementioned insulating means, the sealing resin including different types of insulating resins stacked in layers for sealing is used. Such multi-layered sealing with the sealing resin including different types of insulating resins may be used alone in the multi-layered sealing, or may be further applied to a temperature-sensitive pellet-type thermal fuse having the aforementioned arrangement of the insulating tube.

Effects of Invention

Advantageous effects obtained by the representative configuration of the invention of the present disclosure are briefly described below. According to an embodiment of the present disclosure, electrical disconnection is performed more reliably during a fuse operation.

BRIEF DESCRIPTION OF DRAWINGS

FIG. 1A is a cross-sectional view before operation.

FIG. 1B is a cross-sectional view after operation. It should be noted that FIG. 1B omits the illustration of a temperature-sensitive material.

FIG. 2A is a cross-sectional view before operation.

FIG. 2B is a cross-sectional view after operation. It should be noted that FIG. 2B omits the illustration of a temperature-sensitive material.

FIG. 3A is a cross-sectional view before operation.

FIG. 3B is a cross-sectional view after operation. It should be noted that FIG. 3B omits the illustration of a temperature-sensitive material.

FIG. 4A is a cross-sectional view before operation.

FIG. 4B is a cross-sectional view after operation. It should be noted that FIG. 4B omits the illustration of a temperature-sensitive material.

FIG. 5A is a cross-sectional view before operation.

FIG. 5B is a cross-sectional view after operation. It should be noted that FIG. 5B omits the illustration of a temperature-sensitive material.

DESCRIPTION OF EMBODIMENTS

According to the present invention, there is provided a temperature-sensitive pellet-type thermal fuse that includes, in a tubular case with high electrical conductivity and high thermal conductivity, at least a temperature-sensitive pellet being capable of melting and softening at a specific temperature, a strong compression spring pressing the temperature-sensitive pellet, an insulating lid body closing an end portion of an opening of the tubular case, a weak compression spring being in contact with the insulating lid body, a first lead having an inner end penetrating the insulating lid body as a stationary contact, and a movable contact electrically connected to the first lead and the tubular case, and further includes a second lead disposed at an end of the tubular case. In a sealed portion of the tubular case, at least the end portion of the opening of the tubular case and a proximal portion at an outer end of the first lead are shielded by an insulating means provided between the end portion of the opening of the tubular case and the first lead, and the tubular case, the first lead, and the insulating lid body are sealed with a sealing resin. The aforementioned insulating means improves the electrical insulation property of the narrowest portion of the insulation distance between the tubular case and the first lead. The temperature-sensitive pellet-type thermal fuse according to the present invention may further include disk-shaped presser plates between the temperature-sensitive pellet and the strong compression spring and between the strong compression spring and the movable contact each disposed in the tubular case.

Figure 1A:
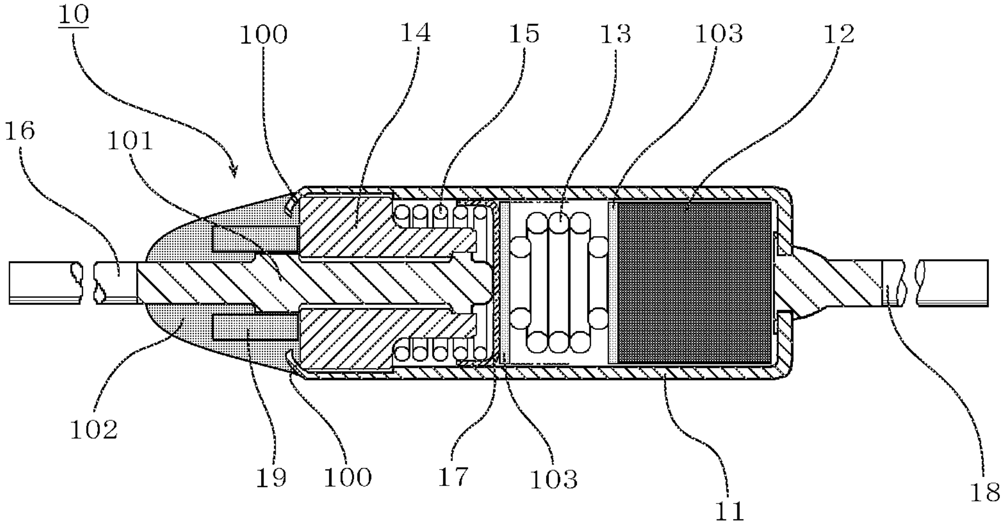
FIG. 1A illustrates a temperature-sensitive pellet-type thermal fuse 10 according to the present invention.
Figure 1B:
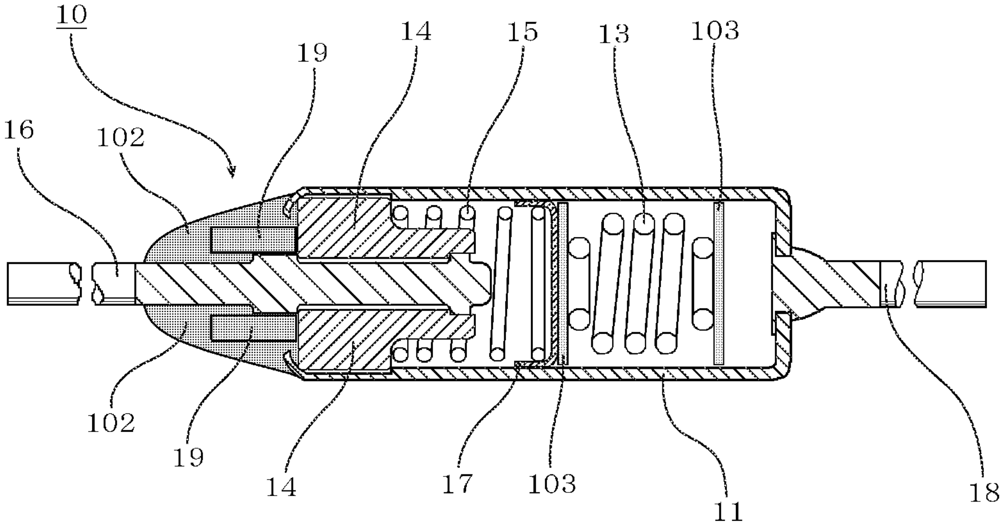
FIG. 1B illustrates a temperature-sensitive pellet-type thermal fuse 10 according to the present invention.

In a preferred configuration, as illustrated in FIGS. 1A and 1B, a temperature-sensitive pellet-type thermal fuse 10 is provided that includes, in a tubular case 11 with high electrical conductivity and high thermal conductivity, at least a temperature-sensitive pellet 12 being capable of melting and softening at a specific temperature, a strong compression spring 13 pressing the temperature-sensitive pellet 12, an insulating lid body 14 closing an end portion 100 of an opening of the tubular case 11, a weak compression spring 15 made of a heat-resistant insulating material and being in contact with the insulating lid body 14, a first lead 16 having an inner end penetrating the insulating lid body 14 as a stationary contact, and a movable contact 17 electrically connected to the first lead 16 and the tubular case 11, and further includes a second lead 18 disposed at an end of the tubular case 11. An insulating tube 19 made of one of ceramics, glass, or highly heat resistant plastic is inserted between the end portion 100 of the opening of the tubular case 11 and a proximal portion 101 at an outer end of the first lead 16. Thus, at least the proximal portion 101 at the outer end of the first lead 16 is shielded, and the tubular case 11, the insulating tube 19, the insulating lid body 14, and the first lead 16 are sealed with a sealing resin 102. The temperature-sensitive pellet-type thermal fuse 10 further includes disk-shaped presser plates 103 between the temperature-sensitive pellet 12 and the strong compression spring 13 and between the strong compression spring 13 and the movable contact 17. The insulating tube 19 includes a tubular body made of a heat-resistant insulating material selected from among ceramics, such as alumina, zirconia, steatite, and forsterite; glass; or engineering plastics, such as polyimide resin (PI), polyether ether ketone resin (PEEK), and liquid crystal polymers (LCPs). The insulating tube 19 forms an insulating means and is provided in contact with an outer end face of the insulating lid body 14. Inserting the insulating tube 19 into the narrowest portion of the insulation distance between the tubular case 11 and the first lead 16 can extend the creepage distance, and thus can improve the electrical insulation property. The insulating tube 19 may be deformed such that at least the inside diameter of an opening at one end thereof is smaller than the inside diameter of an opening at another end like an insulating tube 49 of a temperature-sensitive pellet-type thermal fuse 40 illustrated in FIGS. 4A and 4B.

Figure 2A:
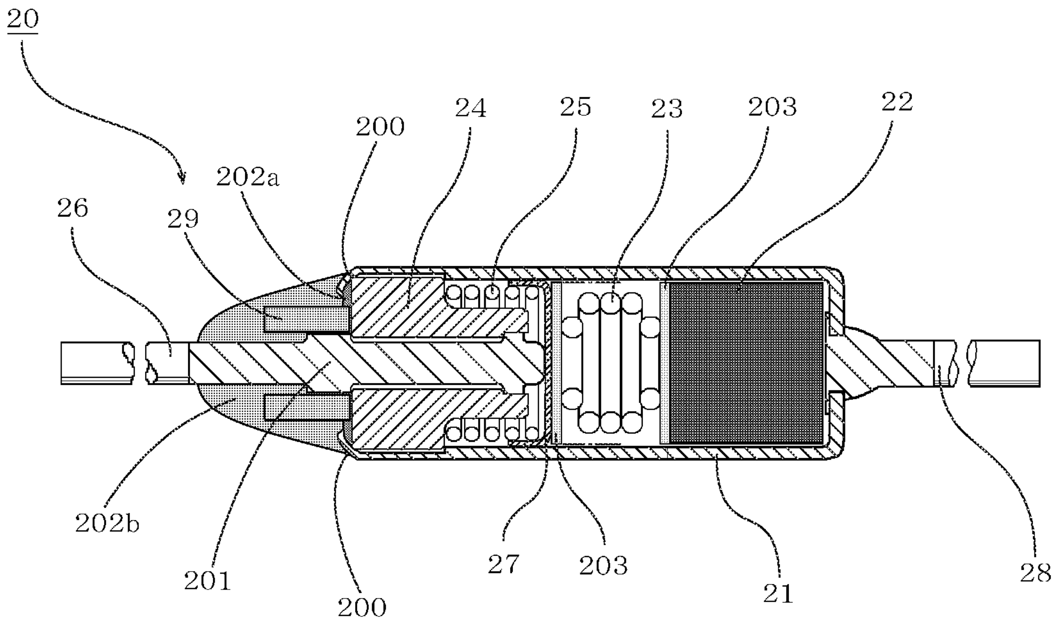
FIG. 2A illustrates a temperature-sensitive pellet-type thermal fuse 20 according to the present invention.
Figure 2B:
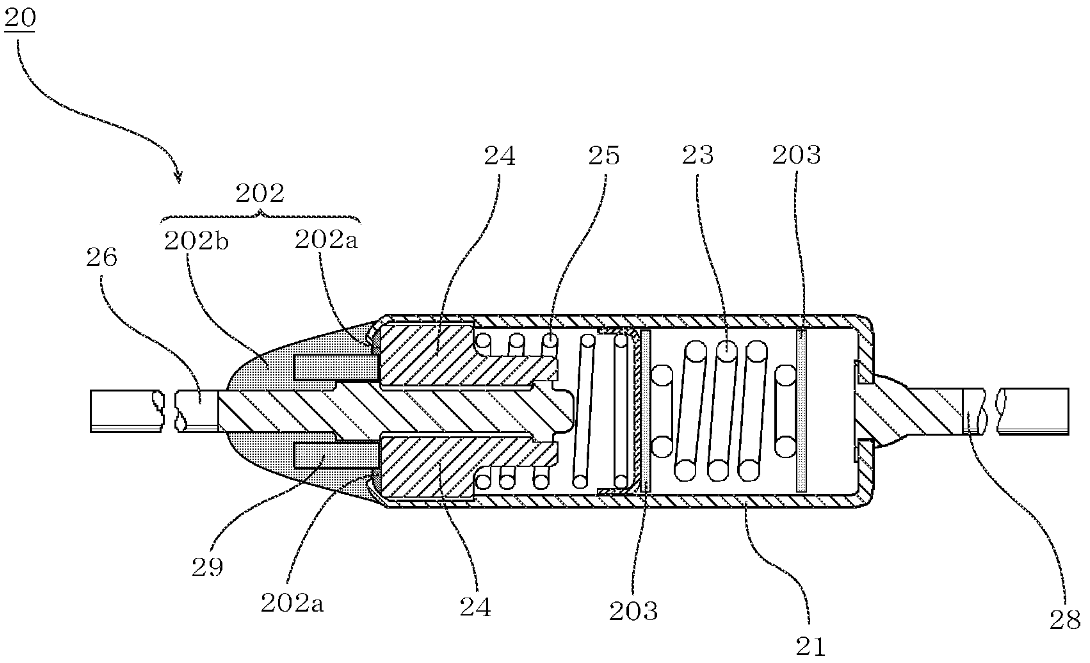
FIG. 2B illustrates a temperature-sensitive pellet-type thermal fuse 20 according to the present invention.
Figure 3A:
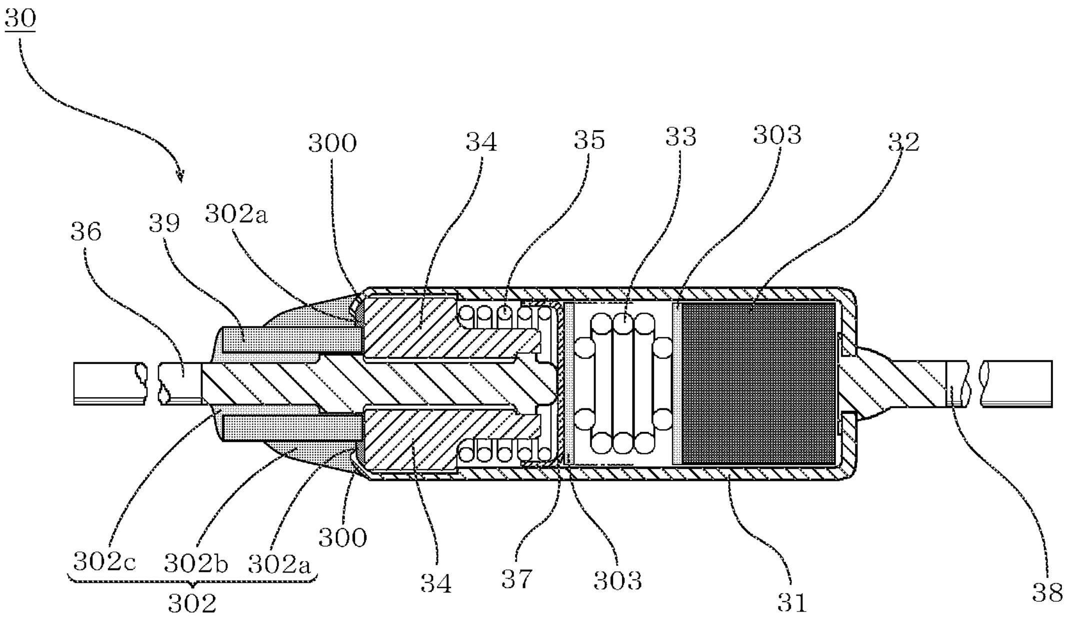
FIG. 3A illustrates a temperature-sensitive pellet-type thermal fuse 30 according to the present invention.
Figure 3B:
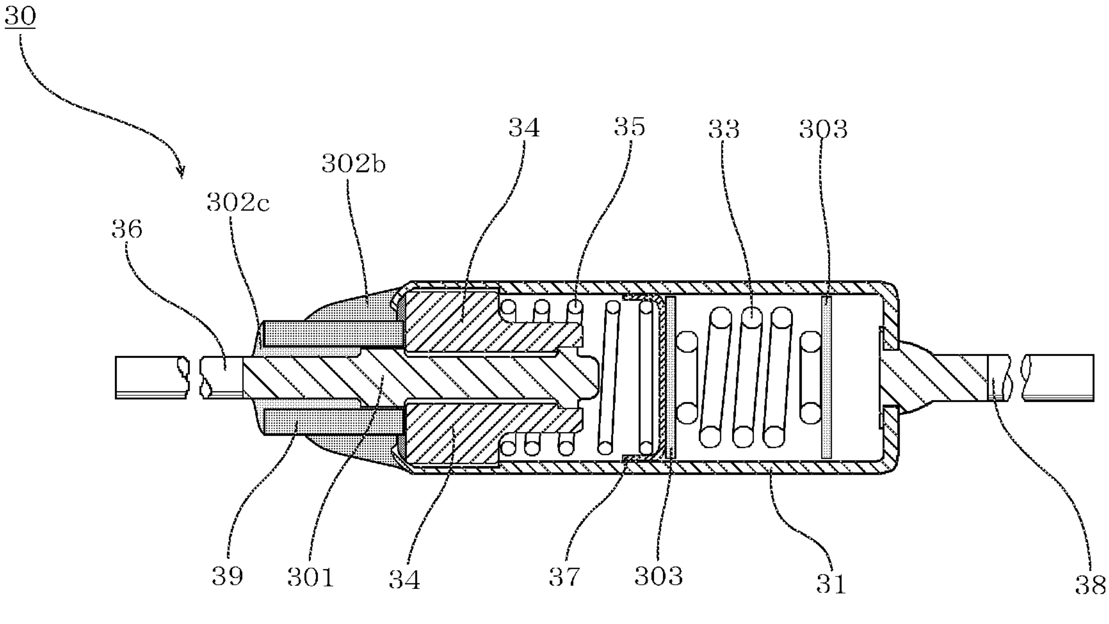
FIG. 3B illustrates a temperature-sensitive pellet-type thermal fuse 30 according to the present invention.

Further, according to the present invention, the sealing resin 102 of the temperature-sensitive pellet-type thermal fuse 10 may include different types of insulating resins stacked in layers for sealing. For example, as illustrated in FIGS. 2A and 2B, it is possible to form a sealing resin 202 by providing a first insulating resin 202*a* covering a region from an outer end face of an insulating lid body 24 to an end portion 100 of an opening of a tubular case 11, and a second insulating resin 202*b* further covering the upper portion of the first insulating resin 202*a*. Further, as illustrated in FIGS. 3A and 3B, it is also possible to form a sealing resin 302 by providing a first insulating resin 302*a* covering an outer end face of an insulating lid body 34, a second insulating resin 302*b* covering the upper portion of the first insulating resin 302*a*, and a third insulating resin 302*c* further covering the surface of the second insulating resin 302*b*. It should be noted that even when the entire surface of an insulating tube 39 is completely covered with the sealing resin 302, it is possible to partially cover portions of the insulating tube 39 that should be insulated and sealed, such as the entire circumference of the inner end and the inside diameter portion of the insulating tube 39, with the sealing resin 302. When different types of resins are used, it is possible to specifically dispose a resin with high volume resistivity at a desired portion and thus easily improve the electrical insulation property without changing the external dimensions of the thermal fuse almost at all, for example. In addition, it is also possible to use resins with different coating properties (which include the permeability/infiltration property, leveling property, and degassing property), different moldability (such as shape stability in three-dimensional forming), and different heat resistance in combination, which can increase the efficiency of coating and three-dimensional forming of the resins and also improve heat resistance. For example, a region from an outer end face of the insulating lid body 34, which includes a proximal portion 301 at an outer end of a first lead 36, to an end portion 300 of an opening of a tubular case 31 is coated with the first insulating resin 302*a* with high volume resistivity, and before the first insulating resin 302*a* cures, the insulating tube 39 is arranged around the first lead 36. Then, the insulating tube 39 is caused to come in to contact with the outer end face of the insulating lid body 34 and the first insulating resin 302*a* is cured, whereby the electrical insulation property is increased. Next, the second insulating resin 302*b* with higher heat resistance and higher kinetic viscosity is three-dimensionally formed over a region from the outer peripheral surface of the insulating tube 39 to the end portion 300 of the opening of the tubular case 31 so as to bury the end portion, and then, the second insulating resin 302*b* is cured, whereby heat resistance is increased. Finally, the upper end of the insulating tube 39 is coated with the heat-resistant third insulating resin 302*c* with low kinetic viscosity so that the resin can permeate the inside of the insulating tube 39, which has not been filled with the resin yet, and the gap between the insulating tube 39 and the first lead 36, and then, the resin is cured. It should be noted that regarding such a temperature-sensitive pellet-type thermal fuse sealed with a plurality of layers of insulating resins, it is possible to omit the insulating tube 39 as appropriate. In addition, the third insulating resin 302*c* may cover the entire outermost surface of the second insulating resin 302*b*.

Figure 5A:
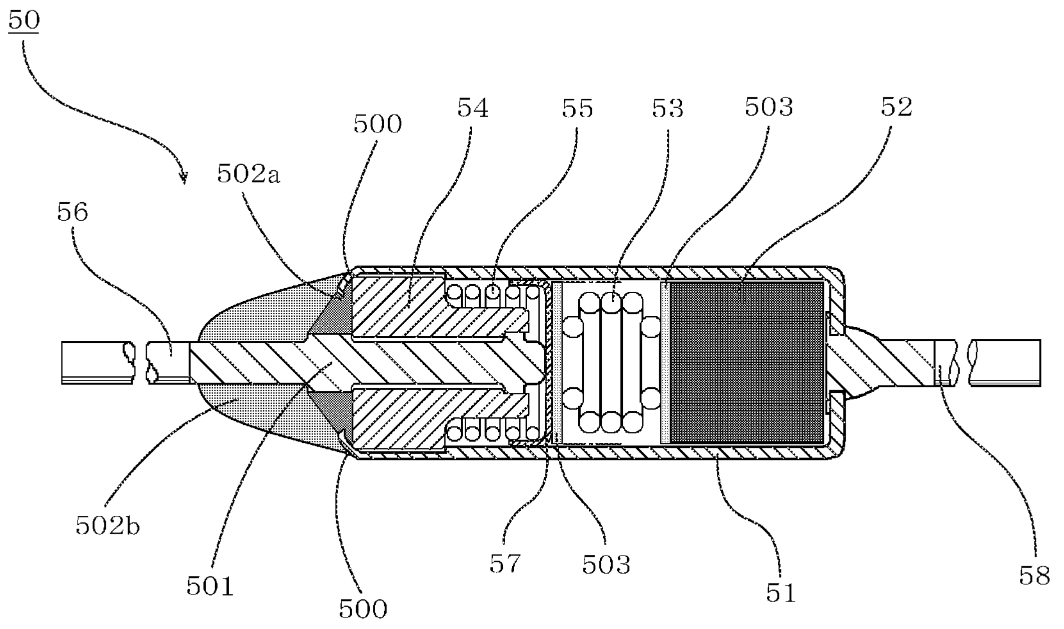
FIG. 5A illustrates a temperature-sensitive pellet-type thermal fuse 50 according to the present invention.
Figure 5B:
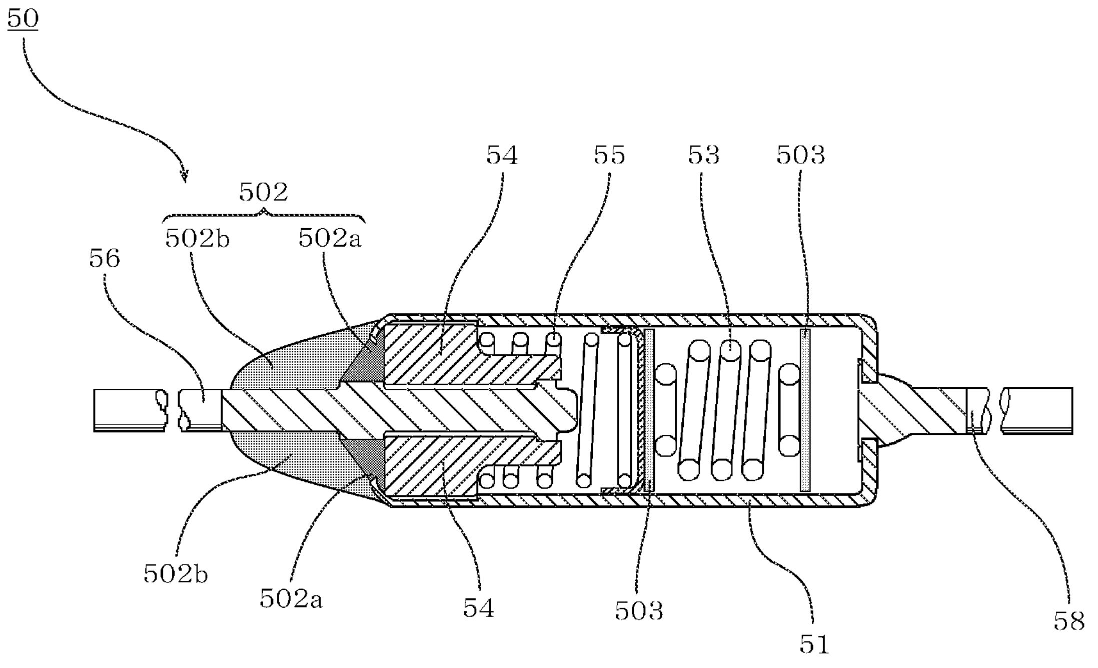
FIG. 5B illustrates a temperature-sensitive pellet-type thermal fuse 50 according to the present invention.
Figure 6:
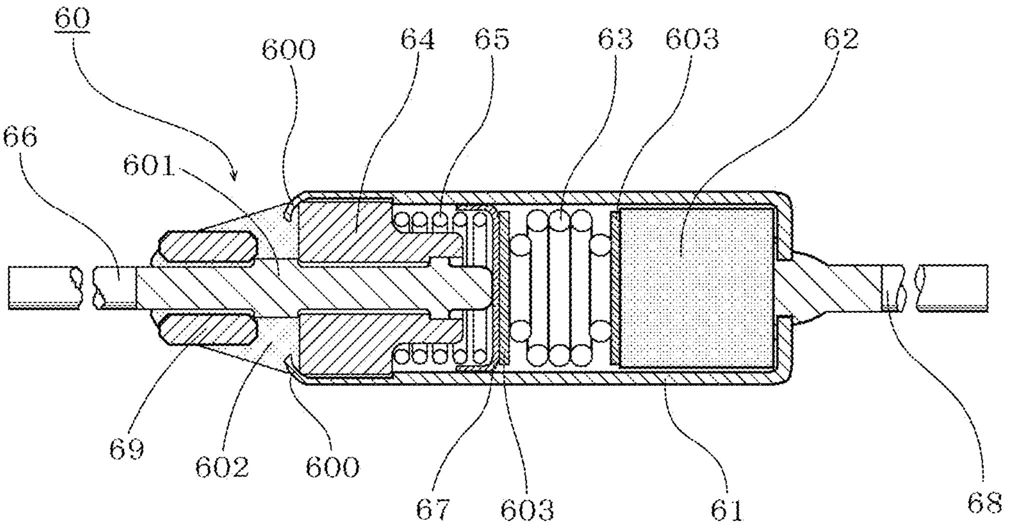
FIG.6 (PRIOR ART)
FIG. 6 is a cross-sectional view of a conventional temperature-sensitive pellet-type thermal fuse 60.

Examples of the aforementioned temperature-sensitive pellet-type thermal fuse with the insulating tube 39 omitted include a temperature-sensitive pellet-type thermal fuse 50 illustrated in FIGS. 5A and 5B. The temperature-sensitive pellet-type thermal fuse 50 includes as an insulating means an insulating resin with higher volume resistivity (which corresponds to a first insulating resin 502*a* below) among sealing resins. Specifically, the temperature-sensitive pellet-type thermal fuse 50 includes, in a tubular case 51 with high electrical conductivity and high thermal conductivity, at least a temperature-sensitive pellet 52 being capable of melting and softening at a specific temperature, a strong compression spring 53 pressing the temperature-sensitive pellet 52, an insulating lid body 54 closing an end portion 500 of an opening of the tubular case 51, a weak compression spring 55 being in contact with the insulating lid body 54, a first lead 56 having an inner end penetrating the insulating lid body 54 as a stationary contact, and a movable contact 57 electrically connecting the first lead 56 and the tubular case 51, and further includes a second lead 58 disposed at an end of the tubular case 51. At least a region from an outer end face of the insulating lid body 54 to the end portion 500 of the opening of the tubular case 51 is covered with the first insulating resin 502*a*. The first insulating resin 502*a* shields a region from the end portion 500 of the opening of the tubular case 51 to a proximal portion 501 at an outer end of the first lead 56. The tubular case 51, an insulating tube 59, the insulating lid body 54, and the first lead 56 are sealed with a sealing resin 502 that includes the first insulating resin 502*a* covering the outer end face of the insulating lid body 54, and a second insulating resin 502*b* further covering the upper portion of the first insulating resin 502*a* as well as the wall surface of the outside diameter portion of the insulating tube 59 and the outer surface of the end portion 500 of the opening. It should be noted that the first insulating resin 502*a* of the temperature-sensitive pellet-type thermal fuse according to the invention need not have a flat shape or need not be provided at a position lower than the end portion 500 of the opening. As illustrated in FIGS. 5A and 5B, the first insulating resin 502*a* may be formed in any shape, such as a mountain shape.

The sealing resin according to the present invention may include two or more types of adhesive insulating resins with different Tgs (glass transition points). To allow at least two resin layers adjoining each other to have different Tgs, it is also possible to use a combination of identical insulating resins that are allowed to have different Tgs by being cured using different curing methods. For example, it is possible to, after forming a first layer of an epoxy resin by curing it at room temperature, form a second layer of the same epoxy resin on the upper surface of the first layer by thermally curing it. Alternatively, it is also possible to select resins in different forms from the group of insulating resins in the forms indicated below. That is, it is possible to select resins from among a water-dispersed form, such as an emulsified resin dispersed in water, a solution-based form, such as a resin dissolved in a volatile solvent, a non-solvent-based form, such as a resin that cures through a chemical reaction of polymerization or condensation, and a solid form, such as a lump, powder, or film-form resin. Tgs of the respective resins may have a difference of at least 5 K or more or preferably 20 K or more in terms of the absolute temperature to keep a good balance between mechanical strength and heat resistance. For example, it is possible to form a first layer using a room-temperature curable epoxy resin and adjust its Tg to 45° C., and then cover the first layer with a second layer with Tg of 100 to 180° C. using a thermosetting epoxy resin. Alternatively, it is also possible to use the same epoxy resin for the first and second layers and adjust their Tgs by changing the curing temperature conditions. For example, it is possible to form a first layer of an epoxy resin by curing it at room temperature and adjust its Tg to 45° C. and then form a second layer with Tg of 55° C. by coating the first layer with the same epoxy resin and thermally curing it at 60° C. The sealing resin is not limited to a particular resin as long as it is a curable resin. For example, a thermosetting silicone resin or an epoxy resin may be used. In particular, an epoxy resin is preferably used.

When the aforementioned sealing resin is formed in a plurality of layers, it is possible to provide the interface between the respective resin layers or the interface between each of the tubular case, the insulating lid body, the insulating tube, and the first lead, which are to be sealed, with a primer coating layer so as to secure adhesiveness of a resin layer to be applied to the interface. In such a case, the sealing resin is formed of two or more resin layers with different Tgs selected from among an epoxy resin, a silicone resin, a rubber-based resin, an acrylic resin, and a two-liquid mixed type acrylic resin, referred to as SGA (Second Generation Acrylic adhesive); and a primer coating layer provided at one of the interfaces. For example, it is possible to provide a room-temperature curable epoxy resin as a first layer, provide a primer coating layer as a second layer, and provide a silicone resin as a third layer.

EMBODIMENTS

As illustrated in FIGS. 1A and 1B, a temperature-sensitive pellet-type thermal fuse 10 of Example 1 according to the present invention includes, in a tubular case 11 with high electrical conductivity and high thermal conductivity, a temperature-sensitive pellet 12 being capable of melting and softening at a specific temperature, a strong compression spring 13 pressing the temperature-sensitive pellet 12, an insulating lid body 14 closing an end portion 100 of an opening of the tubular case 11, a weak compression spring 15 being in contact with the insulating lid body 14, a first lead 16 having an inner end penetrating the insulating lid body 14 as a stationary contact, and a movable contact 17 electrically connecting the first lead 16 and the tubular case 11. The temperature-sensitive pellet-type thermal fuse 10 also includes disk-shaped presser plates 103 between the temperature-sensitive pellet 12 and the strong compression spring 13 and between the strong compression spring 13 and the movable contact 17, and further includes a second lead 18 disposed at an end of the tubular case 11. An insulating tube 19 made of alumina is inserted between the end portion 100 of the opening of the tubular case 11 and a proximal portion 101 at an outer end of the first lead. The insulating tube 19 shields the proximal portion 101 at the outer end of the first lead 16. The tubular case 11, the insulating tube 19, the insulating lid body 14, and the first lead 16 are sealed with a sealing resin 102. The insulating tube 19 forms an insulating means and is fixed to an outer end face of the insulating lid body 14 via the sealing resin 102, thereby improving the electrical insulation property of the narrowest portion of the insulation distance between the tubular case 11 and the first lead 16.

As illustrated in FIGS. 2A and 2B, a temperature-sensitive pellet-type thermal fuse 20 of Example 2 according to the present invention includes, in a tubular case 21 with high electrical conductivity and high thermal conductivity, a temperature-sensitive pellet 22 being capable of melting and softening at a specific temperature, a strong compression spring 23 pressing the temperature-sensitive pellet 22, an insulating lid body 24 closing an end portion 200 of an opening of the tubular case 21, a weak compression spring 25 being in contact with the insulating lid body 24, a first lead 26 having an inner end penetrating the insulating lid body 24 as a stationary contact, and a movable contact 27 electrically connecting the first lead 26 and the tubular case 21. The temperature-sensitive pellet-type thermal fuse 20 also includes disk-shaped presser plates 203 between the temperature-sensitive pellet 22 and the strong compression spring 23 and between the strong compression spring 23 and the movable contact 27, and further includes a second lead 28 disposed at an end of the tubular case 21. An insulating tube 29 made of borosilicate glass is inserted between the end portion 200 of the opening of the tubular case 21 and the first lead 26. The insulating tube 29 shields a proximal portion 201 at an outer end of the first lead 26. The tubular case 21, the insulating tube 29, the insulating lid body 24, and the first lead 26 are sealed with a sealing resin 202. The sealing resin 202 includes two layers: a first insulating resin 202*a* made of an epoxy resin and covering an outer end face of the insulating lid body 24, and a second insulating resin 202*b* made of a silicone resin and further covering the upper portion of the first insulating resin 202*a* as well as the wall surface of the outside diameter portion of the insulating tube 29 and the outer surface of the end portion 200 of the opening.

The first insulating resin 202*a* of the temperature-sensitive pellet-type thermal fuse 20 may be formed using a silicone resin instead of the epoxy resin. The second insulating resin 202*b* may be formed using an epoxy resin instead of the silicone resin.

As illustrated in FIGS. 3A and 3B, a temperature-sensitive pellet-type thermal fuse 30 of Example 3 according to the present invention includes, in a tubular case 31 with high electrical conductivity and high thermal conductivity, a temperature-sensitive pellet 32 being capable of melting and softening at a specific temperature, a strong compression spring 33 pressing the temperature-sensitive pellet 32, an insulating lid body 34 closing an end portion 300 of an opening of the tubular case 31, a weak compression spring 35 being in contact with the insulating lid body 34, a first lead 36 having an inner end penetrating the insulating lid body 35 as a stationary contact, and a movable contact 37 electrically connecting the first lead 36 and the tubular case 31. The temperature-sensitive pellet-type thermal fuse 30 also includes disk-shaped presser plates 303 between the temperature-sensitive pellet 32 and the strong compression spring 33 and between the strong compression spring 33 and the movable contact 37, and further includes a second lead 38 disposed at an end of the tubular case 31. An insulating tube 39 made of liquid crystal polymers is inserted between the end portion 300 of the opening of the tubular case 31 and the first lead 36. The insulating tube 39 shields a proximal portion 301 at an outer end of the first lead 36. The tubular case 31, the insulating tube 39, the insulating lid body 34, and the first lead 36 are sealed with a sealing resin 302. The sealing resin 302 includes a first insulating resin 302*a* made of a room-temperature curable epoxy resin and covering an outer end face of the insulating lid body 34, a second insulating resin 302*b* made of a thermosetting epoxy resin and covering the upper portion of the first insulating resin 302*a* as well as the wall surface of the outside diameter portion of the insulating tube 39 and the outer surface of the end portion 300 of the opening of the tubular case 31, and a third insulating resin 302*c* made of a silicone resin and further covering the surface of the second insulating resin 302*b* as well as the outer end face and the inside diameter portion of the insulating tube 39.

The second insulating resin 302*b* of the temperature-sensitive pellet-type thermal fuse 30 is formed so as to cover a region from the end portion 300 of the opening of the tubular case 31 to the wall surface of the outside diameter portion of the insulating tube 39 toward the outer end portion of the insulating tube 39. At this time, the second insulating resin 302*b* is applied while leaving a part of the wall surface of the outside diameter portion of the insulating tube 39 as illustrated in FIGS. 3A and 3B, or covering the entire wall surface of the outside diameter portion of the insulating tube 39 so that the insulating tube 39 is not exposed at all.

Figure 4A:
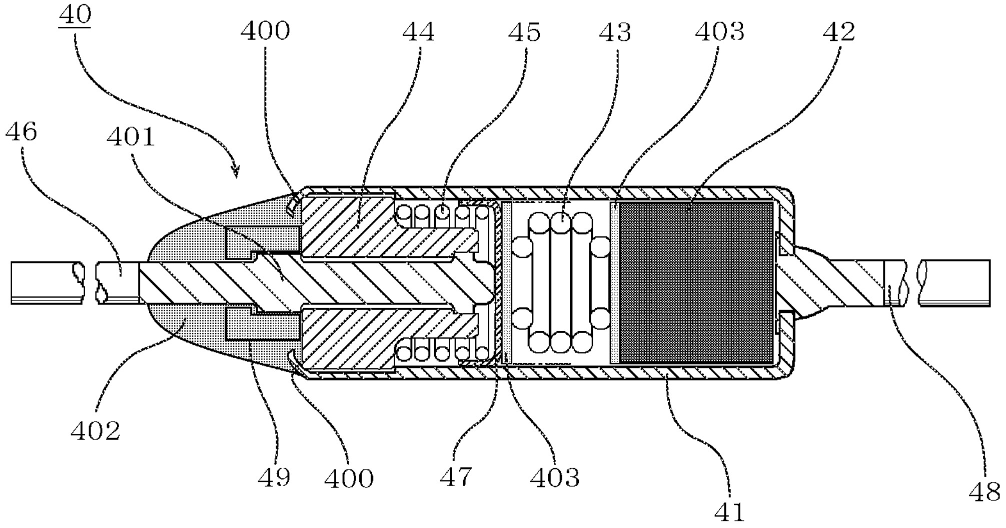
FIG. 4A illustrates a temperature-sensitive pellet-type thermal fuse 40 according to the present invention.
Figure 4B:
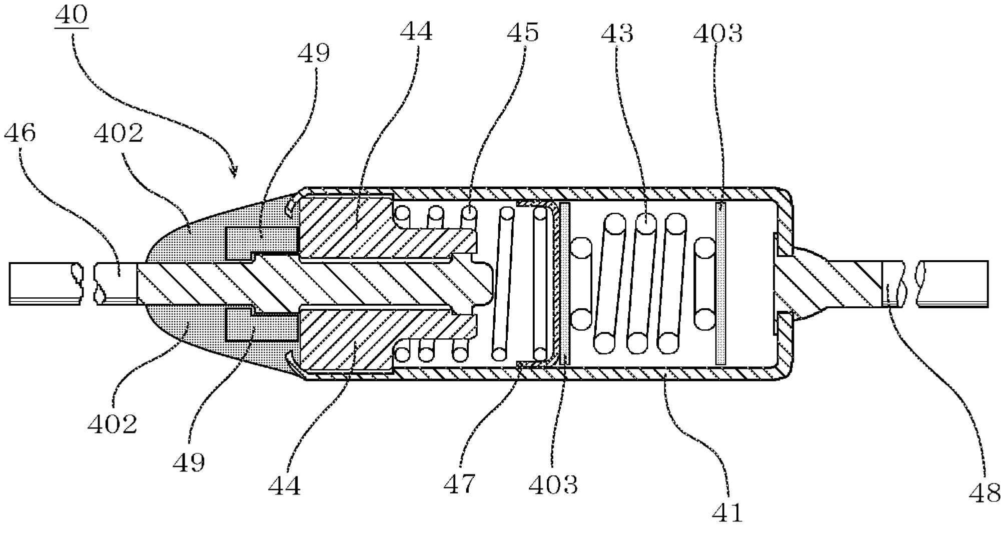
FIG. 4B illustrates a temperature-sensitive pellet-type thermal fuse 40 according to the present invention.

As illustrated in FIGS. 4A and 4B, a temperature-sensitive pellet-type thermal fuse 40 of Example 4 according to the present invention includes, in a tubular case 41 with high electrical conductivity and high thermal conductivity, a temperature-sensitive pellet 42 being capable of melting and softening at a specific temperature, a strong compression spring 43 pressing the temperature-sensitive pellet 42, an insulating lid body 44 closing an end portion 400 of an opening of the tubular case 41, a weak compression spring 45 made of a heat-resistant insulating material and being in contact with the insulating lid body 44, a first lead 46 having an inner end penetrating the insulating lid body 44 as a stationary contact, and a movable contact 47 electrically connected to the first lead 46 and the tubular case 41, and further includes a second lead 48 disposed at an end of the tubular case 41. An insulating tube 49 made of alumina is inserted between the end portion 400 of the opening of the tubular case 41 and a proximal portion 401 at an outer end of the first lead 46. The insulating tube 49 shields at least the proximal portion 401 at the outer end of the first lead 46. The tubular case 41, the insulating tube 49, the insulating lid body 44, and the first lead 46 are sealed with a sealing resin 402. The temperature-sensitive pellet-type thermal fuse 40 further includes disk-shaped presser plates 403 between the temperature-sensitive pellet 42 and the strong compression spring 43 and between the strong compression spring 43 and the movable contact 47. The insulating tube 49 forms an insulating means and is provided in contact with an outer end face of the insulating lid body 44. Inserting the insulating tube 49 into the narrowest portion of the insulating distance between the tubular case 41 and the first lead 46 can improve the electrical insulation property. The insulating tube 49 is formed of a tubular body provided such that the inside diameter of an opening at one end thereof is smaller than the inside diameter of an opening at another end. This can further improve the insulation and shielding properties.

As illustrated in FIGS. 5A and 5B, a temperature-sensitive pellet-type thermal fuse 50 of Example 5 according to the invention includes as an insulating means a first insulating resin 502*a* with higher volume resistivity of a sealing resin 502. Specifically, the temperature-sensitive pellet-type thermal fuse 50 includes, in a tubular case 51 with high electrical conductivity and high thermal conductivity, a temperature-sensitive pellet 52 being capable of melting and softening at a specific temperature, a strong compression spring 53 pressing the temperature-sensitive pellet 52, an insulating lid body 54 closing an end portion 500 of an opening of the tubular case 51, a weak compression spring 55 being in contact with the insulating lid body 54, a first lead 56 having an inner end penetrating the insulating lid body 54 as a stationary contact, and a movable contact 57 electrically connecting the first lead 56 and the tubular case 51. The temperature-sensitive pellet-type thermal fuse 50 also includes disk-shaped presser plates 503 between the temperature-sensitive pellet 52 and the strong compression spring 53 and between the strong compression spring 53 and the movable contact 57, and further includes a second lead 58 disposed at an end of the tubular case 51. A region from an outer end face of the insulating lid body 54 to the end portion 500 of the opening of the tubular case 51 is covered with the first insulating resin 502*a*. The first insulating resin 502*a* shields a region from the end portion 500 of the opening of the tubular case 51 to a proximal portion 501 at an outer end of the first lead 56. The tubular case 51, the insulating tube 59, the insulating lid body 54, and the first lead 56 are sealed with the sealing resin 502. The sealing resin 502 includes two layers: the first insulating resin 502*a* made of an epoxy resin and covering the outer end face of the insulating lid body 54, and a second insulating resin 502*b* made of a silicone resin and further covering the upper portion of the first insulating resin 502*a* as well as the wall surface of the outside diameter portion of the insulating tube 59 and the outer surface of the end portion 500 of the opening. It should be noted that the first insulating resin 502*a* need not have a flat shape or need not be provided at a position lower than the end portion 500 of the opening. As illustrated in FIGS. 5A and 5B, the first insulating resin 502*a* may be formed in any shape, such as a mountain shape.

As described above, even a resin with low volume resistivity can be used by being applied in a plurality of layers, such as two layers or three layers. Consequently, it is possible to use resins that have been conventionally considered to be unsuitable for thermal fuses, and select a desired combination of resins from the perspective of properties, such as heat resistance, workability, gas barrier property, resistance to water, and adhesive force. In addition, the amount of resin that should be used to obtain predetermined volume resistivity can be reduced.

It should be considered that the embodiments disclosed herein are only exemplary and are not restrictive in all aspects. The scope of the present invention is represented by not the aforementioned description but the scope of the claims, and any changes are intended to be included in the scope of the claims and their equivalents.

INDUSTRIAL APPLICABILITY

The present invention can be applied to a contact separation-type thermal fuse that has a movable contact and performs the operation of separating the contact upon detecting an abnormal temperature. In particular, the present invention can be suitably applied to a temperature-sensitive pellet-type thermal fuse.

LIST OF REFERENCE SIGNS

10 temperature-sensitive pellet-type thermal fuse,
11 tubular case,
12 temperature-sensitive pellet,
13 strong compression spring,
14 insulating lid body,
15 weak compression spring,
16 first lead,
17 movable contact,
18 second lead,
19 insulating tube,
100 end portion of opening,
101 proximal portion at outer end,
102 sealing resin,
103 presser plate,
20 temperature-sensitive pellet-type thermal fuse,
21 tubular case,
22 temperature-sensitive pellet,
23 strong compression spring,
24 insulating lid body,
25 weak compression spring,
26 first lead,
27 movable contact,
28 second lead,
29 insulating tube,
200 end portion of opening,
201 proximal portion at outer end,
202 sealing resin,
**202*a*** first insulating resin,
**202*b*** second insulating resin,
203 presser plate,
30 temperature-sensitive pellet-type thermal fuse,
31 tubular case,
32 temperature-sensitive pellet,
33 strong compression spring,
34 insulating lid body,
35 weak compression spring,
36 first lead,
37 movable contact,
38 second lead,
39 insulating tube,
300 end portion of opening,
301 proximal portion at outer end,
302 sealing resin,
**302*a*** first insulating resin,
**302*b*** second insulating resin,
**302*c*** third insulating resin,
303 presser plate,
40 temperature-sensitive pellet-type thermal fuse,
41 tubular case,
42 temperature-sensitive pellet,
43 strong compression spring,
44 insulating lid body,
45 weak compression spring,
46 first lead,
47 movable contact,
48 second lead,
49 insulating tube,
400 end portion of opening,
401 proximal portion at outer end,
402 sealing resin,
403 presser plate,
50 temperature-sensitive pellet-type thermal fuse,
51 tubular case,
52 temperature sensitive pellet,
53 strong compression spring,
54 insulating lid body,
55 weak compression spring,
56 first lead,
57 movable contact,
58 second lead,
59 insulating tube,
500 end portion of opening,
501 proximal portion at outer end,
502 sealing resin,
**502*a*** first insulating resin,
**502*b*** second insulating resin,
503 presser plate

The invention claimed is:

1. A temperature-sensitive pellet-type thermal fuse, comprising in a tubular case with high electrical conductivity and high thermal conductivity:

a temperature-sensitive pellet being capable of melting or softening at a specific temperature;

a strong compression spring pressing the temperature-sensitive pellet;

an insulating lid body closing an end portion of an opening of the tubular case;

a weak compression spring being in contact with the insulating lid body;

a first lead having an inner end penetrating the insulating lid body as a stationary contact;

a movable contact electrically connected to the first lead and the tubular case;

a second lead disposed at an end of the tubular case;

a sealing resin shielding a proximal portion at an outer end of the first lead to seal an insulating tube provided between the end portion of the opening of the tubular case and the first lead in a sealed portion of the tubular case; and, wherein the sealing resin has a first seal resin filled between the end portion of the opening of the tubular case and an outer end face of the insulating lid body to fix the insulating tube and to shield the proximal portion at an outer end of the first lead, and a second seal resin sealing the end portion of the opening of the tubular case and outer end faces of the first lead and the first seal resin.

2. The temperature-sensitive pellet-type thermal fuse according to claim 1, wherein the insulating tube is made of one of ceramics, glass, or highly heat resistant plastic.

3. The temperature-sensitive pellet-type thermal fuse according to claim 1, wherein the insulating tube is made of a heat-resistant insulating material selected from among ceramics such as alumina, zirconia, steatite, and forsterite; glass; and engineering plastics such as polyimide resin (PI), polyether ether ketone resin (PEEK), and liquid crystal polymers (LCPs).

4. The temperature-sensitive pellet-type thermal fuse according to claim 1, wherein the insulating tube is provided such that an inside diameter of an opening at one end of the insulating tube is smaller than an inside diameter of an opening at another end of the insulating tube.

5. The temperature-sensitive pellet-type thermal fuse according to claim 1, wherein the first seal resin is made of a first insulating resin, and the second seal resin is made of a second insulating resin which is different from the first insulating resin.

6. The temperature-sensitive pellet-type thermal fuse according to claim 5, wherein the first seal resin covers a region from the outer end face of the insulating lid body to the end portion of the opening of the tubular case, and the second seal resin covers an upper portion of the first seal resin.

7. The temperature-sensitive pellet-type thermal fuse according to claim 6, wherein the first seal resin or the second seal resin is formed of an epoxy resin or a silicone resin.

8. The temperature-sensitive pellet-type thermal fuse according to claim 6, wherein the insulating tube includes the first seal resin.

9. The temperature-sensitive pellet-type thermal fuse according to claim 5, further comprising a third seal resin covering a surface of the second seal resin.

10. The temperature-sensitive pellet-type thermal fuse according to claim 9, wherein the first seal resin is a room-temperature curable epoxy resin, the second seal resin is a thermosetting epoxy resin, and the seal insulating resin is a silicone resin.

11. The temperature-sensitive pellet-type thermal fuse according to claim 5, wherein the first seal resin covers the outer end face of the insulating lid body, the second seal resin covers an upper portion of the first seal resin as well as a wall surface of an outside diameter portion of the insulating tube and an outer surface of the end portion of the opening of the tubular case, and wherein the temperature-sensitive pellet-type thermal fuse further comprises a third seal resin covering a surface of the second seal resin and an outer end face and an inside diameter portion of the insulating tube.

12. The temperature-sensitive pellet-type thermal fuse according to claim 5, wherein the sealing resin includes two or more types of insulating resins with different Tgs (glass transition points).

13. The temperature-sensitive pellet-type thermal fuse according to claim 12, wherein the first seal resin and the second seal resin have different Tgs by being cured using different curing methods.

14. The temperature-sensitive pellet-type thermal fuse according to claim 12, wherein the Tgs are at least 5 K or more in terms of an absolute temperature.

15. The temperature-sensitive pellet-type thermal fuse according to claim 12, wherein the first seal resin and the second seal resin include insulating resins selected from a group of insulating resins in different forms.

16. The temperature-sensitive pellet-type thermal fuse according to claim 15, wherein the forms include a water-dispersed form, such as an emulsified resin dispersed in water, a solution-based form, such as a resin dissolved in a volatile solvent, a non-solvent-based form, such as a resin that cures through a chemical reaction of polymerization or condensation, and a solid form, such as a lump, powder, or film-form resin.

17. The temperature-sensitive pellet-type thermal fuse according to claim 12, wherein the Tgs are at least 20 K or more in terms of an absolute temperature.

18. The temperature-sensitive pellet-type thermal fuse according to claim 5, wherein an first interface between the first and second seal resins of the sealing resin, or second interface between each of the tubular case, the insulating lid body, the insulating tube, and the first lead to be sealed is provided with a primer coating layer to secure adhesiveness of a resin layer to be applied to the first interface or the second interface.

19. The temperature-sensitive pellet-type thermal fuse according to claim 18, wherein the sealing resin is formed of two or more resin layers with different Tgs and a primer coating layer provided at third interface between two of the two or more resin layers, the two or more resin layers being selected from among an epoxy resin, a silicone resin, a rubber-based resin, an acrylic resin, and a two-liquid mixed type acrylic resin, referred to as SGA (Second Generation Acrylic adhesive).

* * * * *